US012646913B2

(12) United States Patent (10) Patent No.: US 12,646,913 B2
Stull et al. (45) Date of Patent: Jun. 2, 2026

(54) METHOD FOR CABLE BRAID FOLDING

(71) Applicant: TE Connectivity Solutions GmbH, Schaffhausen (CH)

(72) Inventors: David Michael Stull, Middletown, PA (US); Rodney Spade, Middletown, PA (US); Christopher John Gavlak, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 177 days.

(21) Appl. No.: 18/745,162

(22) Filed: Jun. 17, 2024

(65) Prior Publication Data

US 2025/0385496 A1 Dec. 18, 2025

(51) Int. Cl.
*H02G 1/12* (2006.01)

(52) U.S. Cl.
CPC ......... *H02G 1/1256* (2013.01); *H02G 1/1248* (2013.01); *H02G 1/1265* (2013.01); *H02G 1/1297* (2013.01)

(58) Field of Classification Search
CPC .. H02G 1/1265; H02G 1/1297; H02G 1/1248; H02G 1/1256
USPC ......................................................... 83/880
See application file for complete search history.

(56) References Cited

U.S. PATENT DOCUMENTS

| | | | | | |
|---|---|---|---|---|---|
| 3,171,306 | A | * | 3/1965 | Mirsch ................ | H02G 1/1273 81/9.51 |
| 3,820,420 | A | * | 6/1974 | Mathews ............. | H02G 1/1226 407/120 |

| | | | | | |
|---|---|---|---|---|---|
| 4,719,697 | A | * | 1/1988 | Schwartzman ........ | H01R 43/05 81/9.51 |
| 4,914,986 | A | * | 4/1990 | Masaki ................ | H02G 1/1273 81/9.51 |
| 6,243,947 | B1 | * | 6/2001 | Fujita ................... | H02G 1/1256 29/33 F |
| 6,659,140 | B2 | * | 12/2003 | Yamakawa ............ | H01R 43/28 140/71 R |
| 6,776,196 | B2 | * | 8/2004 | Yamakawa ............ | H01R 43/05 140/71 R |
| 6,883,232 | B2 | * | 4/2005 | Sato ..................... | H02G 15/068 29/748 |
| 9,906,005 | B2 | * | 2/2018 | Baldauf ............... | H02G 1/1297 |
| 10,840,680 | B2 | | 11/2020 | Houser et al. | |
| 11,280,635 | B2 | | 3/2022 | Houser et al. | |
| 11,329,460 | B2 | * | 5/2022 | Duncan ................. | H01R 43/28 |
| 11,362,492 | B2 | * | 6/2022 | Houser ................. | H01R 43/28 |
| 11,710,950 | B2 | * | 7/2023 | Morris ................... | H02G 1/127 30/90.1 |
| 11,804,687 | B2 | * | 10/2023 | Sugawara ............ | H02G 1/1292 |

(Continued)

FOREIGN PATENT DOCUMENTS

DE 102020120110 A1 2/2022

OTHER PUBLICATIONS

European Search Report, European U.S. Appl. No. 25/183,486 International Filing Date Jun. 17, 2025.

*Primary Examiner* — Sean M Michalski

(57) ABSTRACT

A method of processing a cable with a cable preparation device comprises the steps of: 1) flaring an exposed free end of at least one layer of the cable; and 2) folding the flared exposed free end of the at least one layer of the cable over a portion of the cable by engaging the exposed free end with a curved folding surface defined on a cutting blade of the cable preparation device.

20 Claims, 15 Drawing Sheets

(56)     References Cited

U.S. PATENT DOCUMENTS

| 12,340,921 | B2 * | 6/2025 | Wang ................... H01B 13/016 |
| 12,438,347 | B2 * | 10/2025 | Kightlinger .......... H02G 1/1265 |
| 2002/0121159 | A1 * | 9/2002 | Yamakawa ............ H01R 43/28 |
| | | | 81/9.42 |
| 2012/0073428 | A1 | 3/2012 | Milinkovic et al. |
| 2015/0288153 | A1 * | 10/2015 | Baldauf ............... H02G 1/1256 |
| | | | 81/9.42 |
| 2018/0278032 | A1 * | 9/2018 | Ben-Ron ............. B23K 26/351 |
| 2020/0067289 | A1 | 2/2020 | Houser et al. |
| 2020/0161843 | A1 * | 5/2020 | Duncan ................ H02G 1/1297 |
| 2020/0412075 | A1 * | 12/2020 | Sugawara ............ H02G 1/1292 |
| 2021/0143604 | A1 * | 5/2021 | Pechter ................ H02G 1/1248 |
| 2021/0249831 | A1 * | 8/2021 | Steinigen ............. H02G 1/1202 |
| 2022/0231493 | A1 | 7/2022 | Morris et al. |
| 2022/0351881 | A1 * | 11/2022 | Yang ...................... H01R 43/28 |
| 2023/0072308 | A1 * | 3/2023 | Mabuchi ............... H02G 1/126 |
| 2025/0007259 | A1 * | 1/2025 | Yaguchi ............... H02G 1/1256 |

* cited by examiner

METHOD FOR CABLE BRAID FOLDING

FIELD OF THE INVENTION

The present disclosure relates to electrical cable processing, and more particularly, to a system and method for folding a flared cable braid with a cutting blade of a cable preparation machine.

BACKGROUND

The preparation of wire and cable for use in electrical systems is time consuming and expensive. In some applications, a cable may comprise several layers, including those made of materials which are difficult to selectively remove or otherwise manipulate in preparation for, for example, connectorization of the cable.

High voltage electrical cable is one such application requiring significant effort to process the cable ends prior to use. Referring generally to FIG. 1, a typical high voltage electrical cable 10 comprises a central wire or conductor 12 which is covered with a silicone insulation layer 14. A foil layer 15 is helically wrapped around the insulation layer 14, onto which a conductive woven or mesh braid or braiding layer 16 is placed. Finally, an outer silicone insulation layer 18 may be applied over the braiding layer 16. Depending on the application, it may be desired to remove any one or more of these layers to expose an underling layer. For example, the outer insulation layer 18 may be removed to reveal the braiding layer 16. This braiding or braiding layer 16 may be required to be flared (e.g., at least partially radially outward). Further, subsequent connectorization of the cable 10 may require one or more layers of the cable to be folded. For example, an exposed portion of the braiding layer 16 may need to be folded back and over the outer insulation layer 18.

Currently, this braiding layer folding step is performed either via a separate processing station, distinct from a station used to cut one or more layers of the cable and/or flare the braiding layer, or may be performed by hand. Both methods add significant cost, complexity and time to cable processing and preparation. Further, manual methods produce inconsistent results, and often result in user fatigue.

Accordingly, there is a need for improved systems and methods for accurately and expediently performing these types of wire or cable preparation operations.

SUMMARY

In one embodiment of the present disclosure, a cable preparation or processing device includes at least one cutting blade and a processor. The cutting blade defines a cutting edge and a curved folding surface. The processor is operative with a memory device to: 1) with at least one first actuator, engage the cutting edge of the cutting blade with the cable in a cutting direction for removing a portion of a first layer of the cable and exposing a portion of a second layer of the cable; and 2) with at least one second actuator, engage the folding surface of the at least one cutting blade with an exposed free end of the second layer of the cable for folding the free end of the second layer backwards over a portion of the cable.

In another embodiment of the present disclosure, a method of processing a cable with a cable preparation device comprises the steps of: 1) flaring an exposed free end of at least one layer of a cable; and 2) folding the exposed free end of the at least one layer of the cable over a portion of the cable by engaging the exposed free end of at least one layer of a cable with a curved folding surface defined on a cutting blade of the cable preparation device.

According to another embodiment, a method of processing a cable with a cable preparation device comprises the steps of: 1) removing a portion of an outer insulation layer of the cable with a cutting edge of a cutting blade of the cable preparation device; 2) flaring an exposed free end of a braiding layer of the cable with a flaring element; and 3) folding the exposed free end of the braiding layer cable backwards over a portion of the outer insulation layer by engaging the exposed free end of the braiding layer with a curved folding surface defined on the cutting blade.

BRIEF DESCRIPTION OF THE DRAWINGS

The invention will now be described by way of example with reference to the accompanying Figures, of which.

DETAILED DESCRIPTION OF THE EMBODIMENTS

Figure 1:
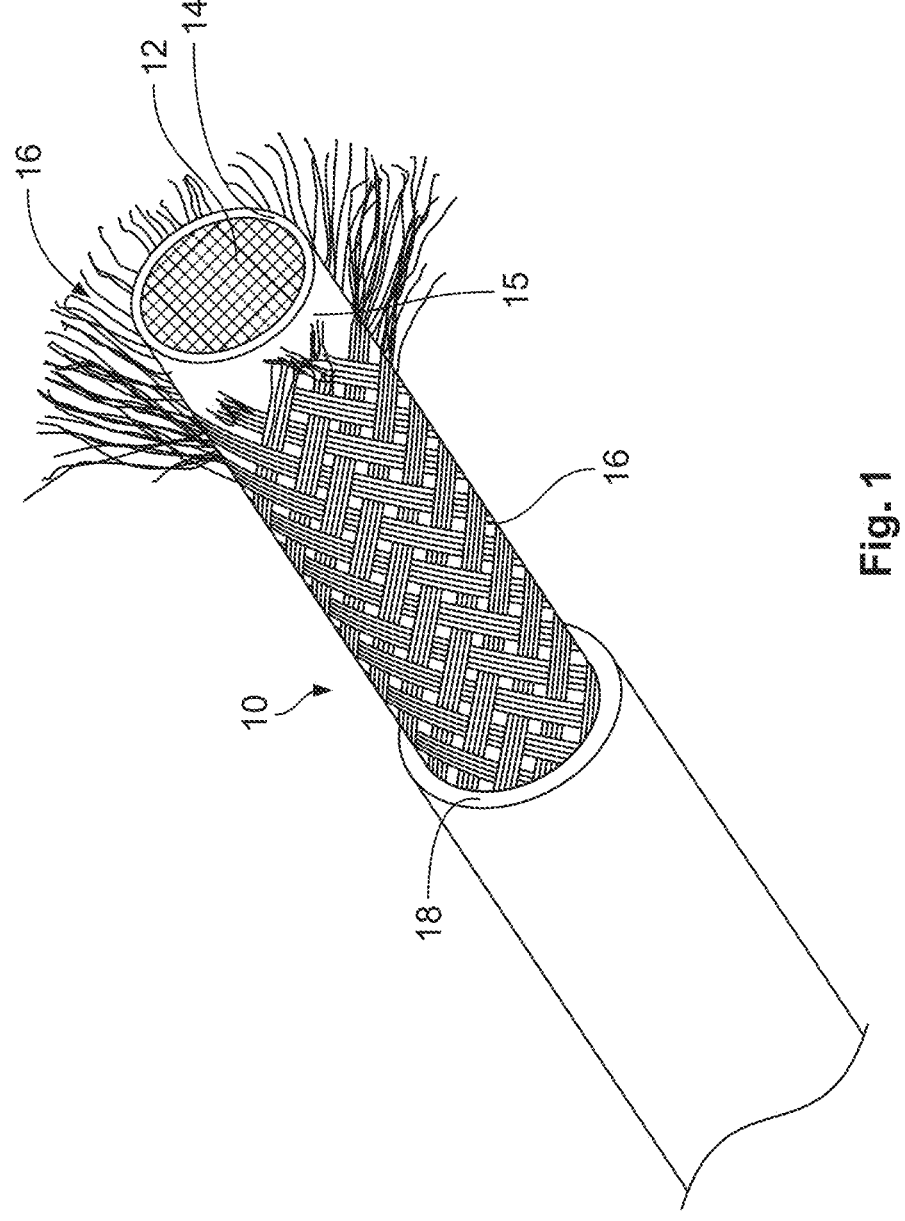
FIG. 1 is a perspective view of an exemplary multi-layer high voltage electrical cable useful for describing embodiments of the present disclosure.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure are directed to an improved cutting blade and associated method of using the same in conjunction with a rotating cable preparation machine or device. According to an embodiment, a cutting blade assembly of the cable preparation machine includes a plurality of cutting blades adapted to engage with a cable for selectively cutting and removing one or more layers of the cable during processing (e.g., an outer insulation layer of the cable) with a cutting edge thereof. The cutting blades define a curved or contoured folding surface facing in an axial direction of the cable. The folding surface is adapted to fold back an exposed flared portion of the cable, such as the braiding layer of the cable. The machine further includes a flaring assembly adapted to flare the braiding layer of the cable prior to folding, and a cable holder selectively fixing the cable relative to the cutting blade and flaring assemblies. In one embodiment, the cable holder is movable in an axial direction relative to the cable preparation machine for moving the cable relative to the cutting blade and flaring assemblies.

With the braiding layer of the cable flared by the flaring assembly, the cutting blades are translated into a folding position relative to the cable. The cable is then biased in an axial direction relative to the cutting blades such that the flared braiding layer engages with the folding surface of each cutting blade in the axial direction. Translation of the cable (or the cutting blade assembly) in the axial direction is operative to fold the braiding layer back and over, for example, the outer insulation of the cable. The curved folding surface of the cutting blade is adapted to capture all braid material by conforming to the radius of the cable and conducting a series of push, retract, rotate, and push steps to achieve complete folding of the braiding.

Figure 2:
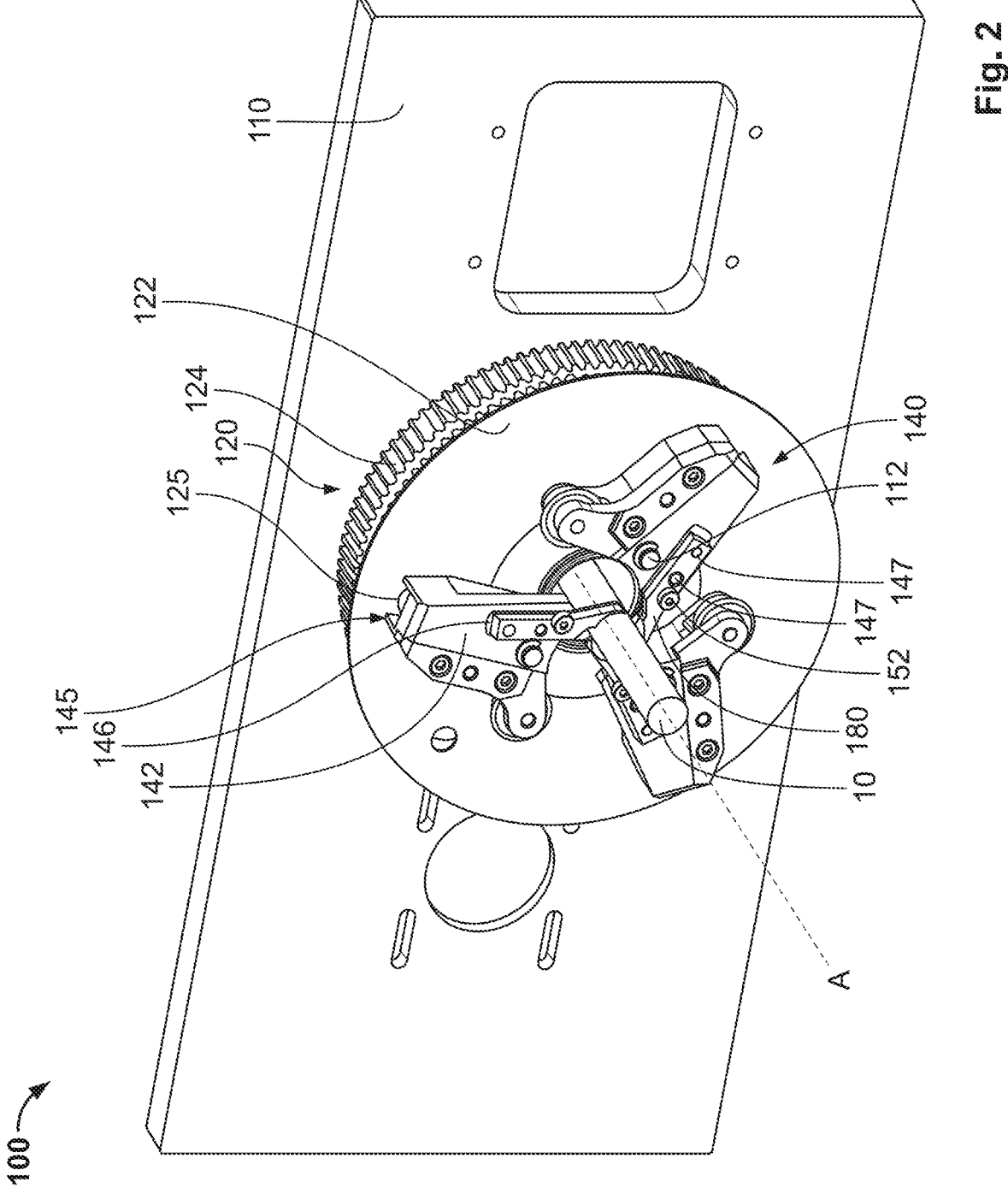
FIG. 2 is a front view of an HV-CP machine utilizing a plurality of cutting depth control devices or blade stops according to an embodiment of the present disclosure for processing a cable.
Figure 3:
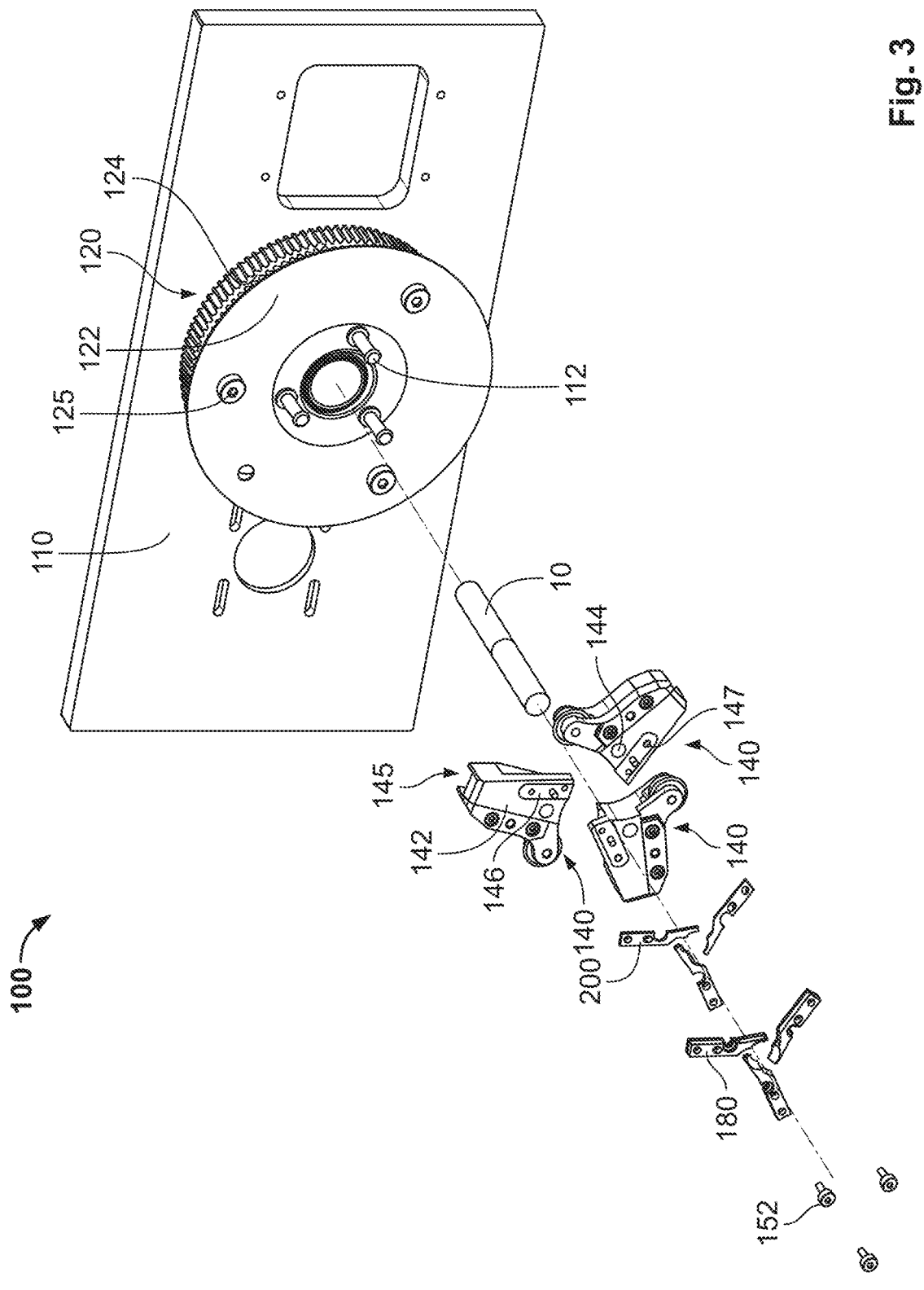
FIG. 3 is a partially exploded view of a cutting assembly of the HV-CP of FIG. 2.

Embodiments of the present disclosure are described herein in the context of their operation in an exemplary HV-CP machine 100, 100'. As shown in FIGS. 2 and 3, the HV-CP machine 100 includes a base 110 to which a rotating pulley assembly 120 is mounted. In one embodiment, the pulley assembly 120 includes a first pulley 122 and a second pulley 124, each independently rotatably mounted to the base 110 about a central axis A. The pulleys 122,124 may be belt driven, by way of example only, and comprise central openings along the axis A through which an end of a cable 10 to be processed is passed. The cable 10 may be held by a clamp or clamping device (see FIGS. 13-16 and the cable clamp 478) of the machine 100, such that it is fixed in position relative to the rotating pulley assembly 120.

A plurality of blade holders or cutting heads 140 (e.g., three) are rotatably attached to the pulley 122 via corresponding axles 112. The rotational or radial position of each blade holder 140 is adjustable about the axle 112 for adjusting the position of a corresponding cutting blade 180 attached thereto relative to the cable 10. By way of example only, each blade holder 140 may be operatively connected to the rotating pulley 124 for achieving the rotatory adjustment of the blade holders. Specifically, a cam follower 125 extending from and attached to the pulley 124 may engage with a corresponding aperture 145 formed in an end of a body 142 of the blade holder 140 opposite the axle 112. In this way, altering the relative radial positions of the pulley 122 and the pulley 124 is operative to alter the angle of the cutting head 140 about the axle 112, and thus the position of the blade 180 relative to the cable 10. By connecting blade holder 140 to both the first and second pulleys 122,124 in this manner, the rotational motion of each blade holder 140 about a respective axle 112 is synchronized, ensuring the relative positions of the cutting blades 180 are maintained as they are selectively moved into and out of contact with the cable 10 in the radial directions. The cable clamp 478 and/or the blade holders 140 may also be moveable in an axial direction along the illustrated axis A. In this way, after a cutting operation is performed, cut material may be removed by translating cable relative to the holders 140 (and the blades 180) axially, pulling the cut material from a remainder of the cable.

Still referring to FIGS. 2 and 3, the body 142 of each blade holder 140 defines an aperture 144 for receiving a respective one of the axles 112 in a rotatable manner. A slot 146 is defined in a front face of the body 142 and is sized to receive a cutting depth control device or blade stop 200, as well as a respective one of the cutting blades 180. One or more locating pins 147 may be arranged within the slot 146 and extend from the front face thereof for engaging with corresponding apertures formed through the blade stop 200 and the cutting blade 180 for fixing their position relative to the blade holder 140. Further, a threaded aperture may be formed into the body 142 in the area of the slot 146 for receiving a fastener 152 for securing the blade stop 200 and the blade 180 to the holder 140.

Figure 4:
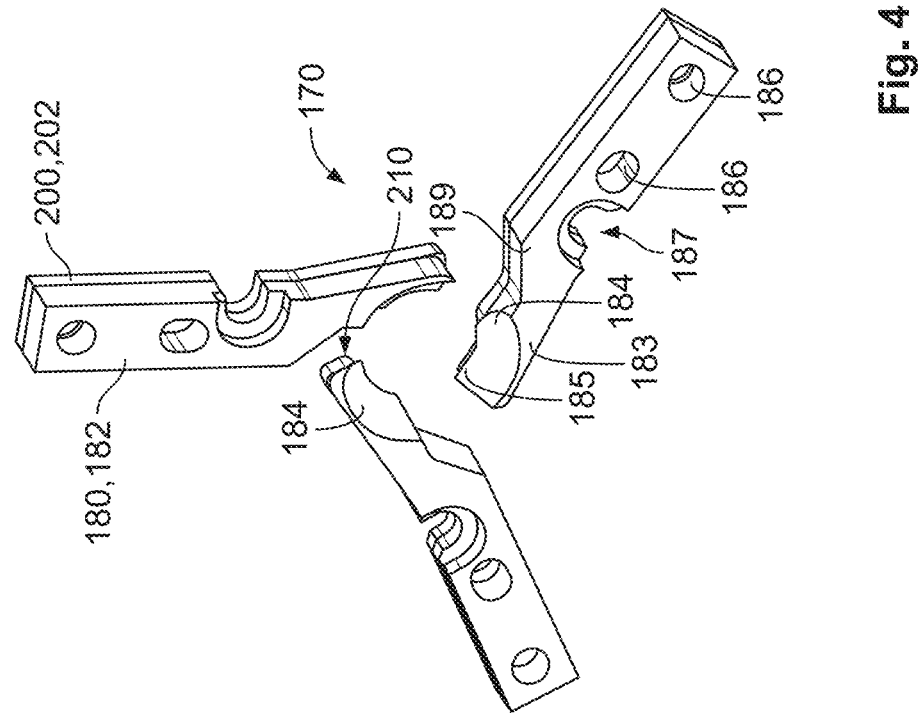
FIG. 4 is an isolated view of a plurality of rotary cutting blades and associated cutting depth control devices according to an embodiment of the present disclosure.

Referring to FIG. 4, a cutting blade assembly 170 according to an embodiment of the present disclosure includes a plurality of pairs (e.g., three pairs) of cutting blades 180 and corresponding blade stops 200. The blade and blade stop pairs are arranged generally 120 degree apart with respect to the central axis of rotation of the cutting machine 100 and/or the ideal axial center of a cable held therein. See axis A of FIG. 2. Each cutting blade 180 includes a body 182 defining a folding surface 184. In the exemplary embodiment, a cutting or sharpened edge 185 is defined on an end edge and comprises an arcuate or curved profile defining a portion of a circle, with a radius of curvature defined about a center of the assembly 170, or the rotational axis A of the cutting machine. In this way, as each of the blades 180 converge toward the ideal radial center of a cable, the cutting edges 185 likewise converge to define a continuous or near continuous circular cutting edge (i.e., forming a majority of a circle) for simultaneously engaging with and cutting a majority of an outer circumferential surface of the cable. From the cutting edge 185, the folding surface 184 defines a contoured or partially-spherical profile extending through a thickness of the body 182 toward a front face 183 thereof.

Still referring to FIG. 4, the body 182 further defines a plurality of locating apertures 186 for receiving the locating pins 147 or other locating or keying features of the blade holder 140 for accurately fixing the position of the cutting blade 180 relative to the holder. The body 182 may define a stepped and/or slotted aperture 187 for receiving a respective one of the fasteners 152 in a recessed manner for securing the blade 180 and the blade stop 200 to the holder 140. As illustrated, one or more of the apertures 186, 187 may be slotted, elongated over otherwise over-sized in profile, facilitating the fixation of the cutting blades 180 and/or the blade stops 200 of each pair in a number of varying positions, for adjusting a cutting depth of the assembly 170. The body 182 further defines a tapered mid portion 189 such that a width of the body 182 is reduced from an end thereof defining the folding surface 184 compared to that of the end mounted to the holder 140. The reduced width of the cutting end of the body 182 creates additional clearance, allowing for adjacent blades/stop pairs to be arranged in closer proximity to one another as they converge during a cutting or processing operation. As a result, spacing between adjacent blades can minimized during cutting, improving the cutting quality.

Figure 5:
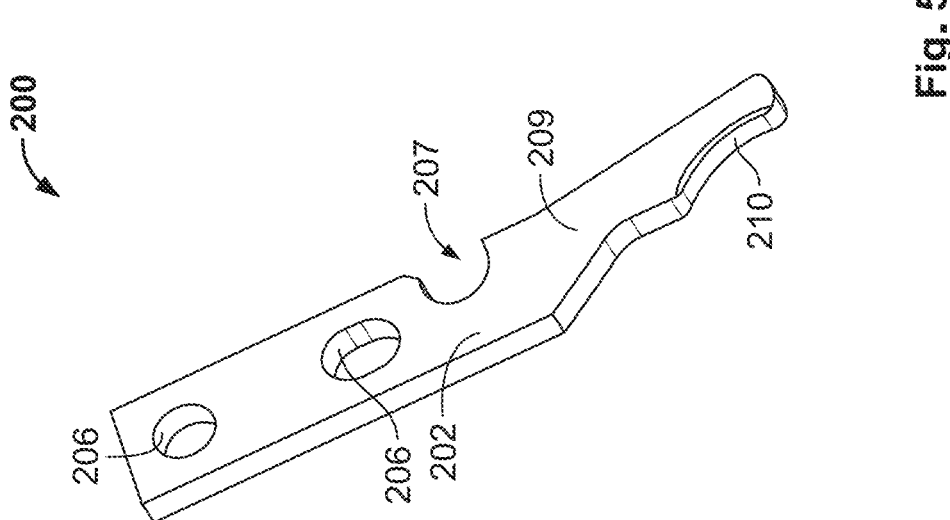
FIG. 5 is a perspective view of one of the cutting depth control devices according to an embodiment of the present disclosure.

With particular reference to FIGS. 4 and 5, the depth control device or blade stop 200 includes a body 202 having a profile generally corresponding to or matching that of the body 182 of the blade 180, including a first end having a width and shape corresponding to that of the slot 146 formed in the holder 140, a tapered mid portion 209, and a narrowed second end defining an engaging or stop surface 210. The body 202 of the blade stop 200 further defines locating apertures or openings 206 for receiving the pins 147 of the holder 140, as well as a clearance slot 207 corresponding to the stepped slot 187 of the blade 180 for receiving the mounting fastener 152. As set forth above, the locating openings 186,206 of the blade 180 and/or the blade stop 200 may be slotted such that their fixed positions relative to the holder may be adjusted. Likewise, in some embodiments, only the apertures 206 of the stop 200 may be slotted, permitting the adjustment of the allowable cutting depth of the blade 180 by altering the position of only the blade stop 200.

As described above, the stop or engaging surface 210 of the blade stop 200 is configured to oppose and abut the outer surface of the cable during a cutting operation. Specifically, the stop surface 210 defines a profile that extends in a smooth, linear manner across its thickness, or in a direction parallel to the axis of rotation A of the cutting machine and/or the axial direction of the cable. The stop surface 210 is further curved in a radial direction of the cable with which is engages, or curved about an axis of curvature coaxial with the axis of rotation A of the cutting machine and/or the cable. In this way, the stop surface 210 defines a curved profile matching that of an outer surface of the cable with which it engages.

Figure 6:
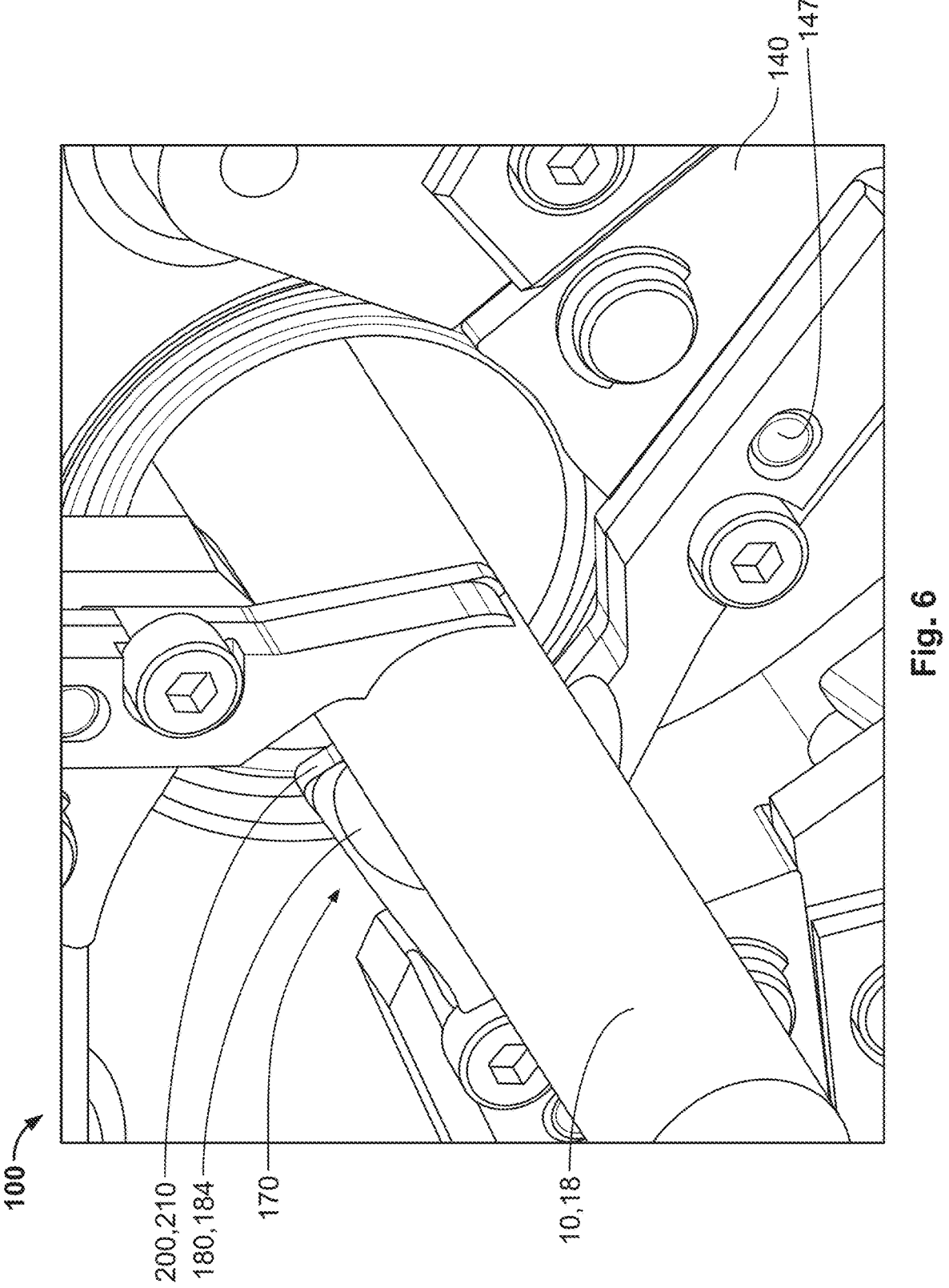
FIG. 6 is a detailed perspective view of the HV-CP machine of FIG. 2 performing a cable processing operation.
Figure 7:
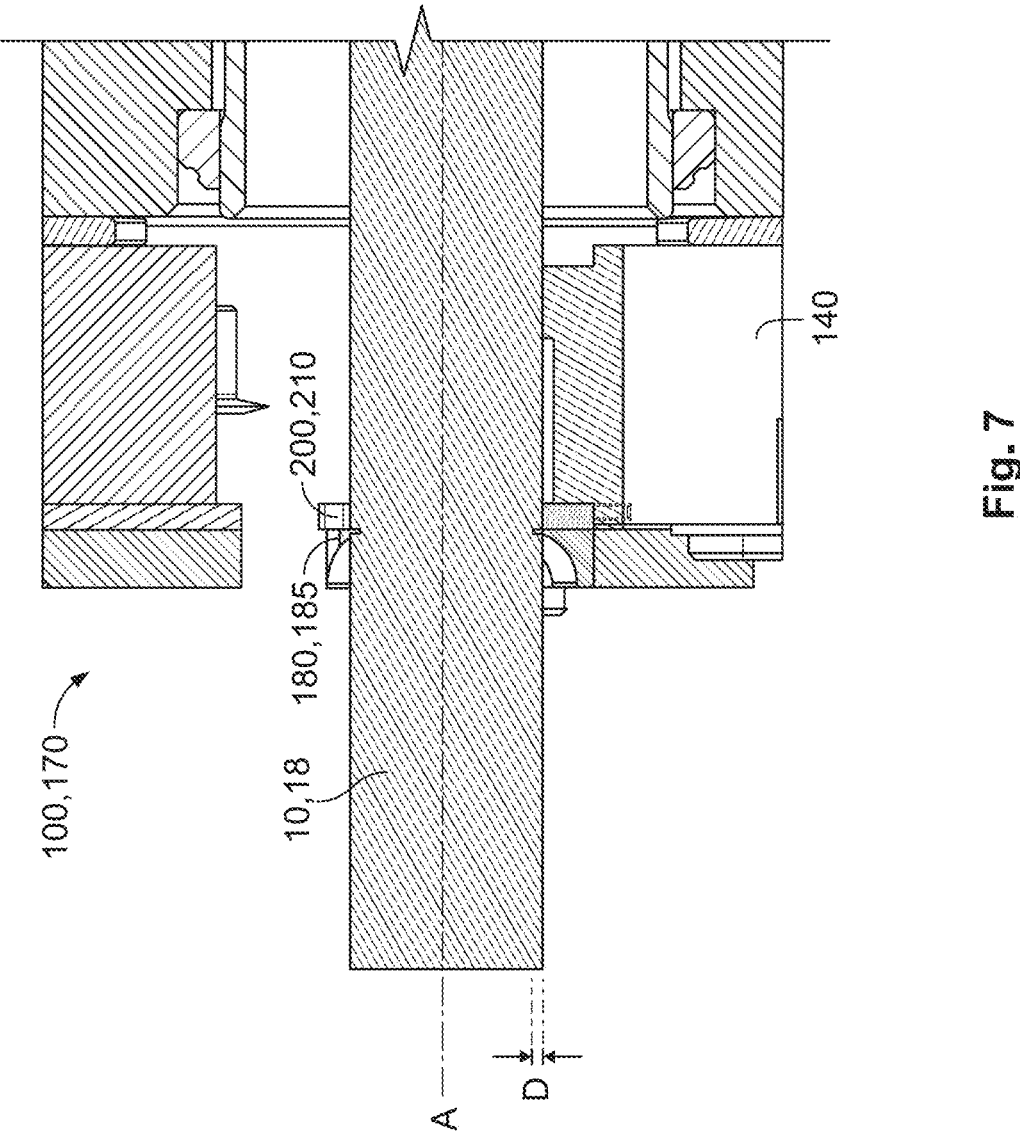
FIG. 7 is a side cross-sectional view of the HV-CP machine of FIG. 2 performing the cable processing operation shown in FIG. 6.

Referring now to FIGS. 6 and 7, the cutting blades 180 are shown engaged with the cable 10 during a cutting operation performed by the HV-CP machine 100. The cutting blades 180 are configured to move in radially inward and outward directions relative to the axis of rotation A via a corresponding motion of the blade holders 140. As illustrated, the blades 180 have been biased radially inward in a cutting direction, with the leading or cutting edges thereof cutting through the outer insulation layer or sheathing 18 of the cable 10. The stop surface 210 is positioned directly adjacent to the folding surface 184 of the blade 180 in an installed position, with the stop surface offset from the leading or cutting edge 185 of the cutting blade 180 in a radially-outward direction of the cable, or in a direction opposite the cutting direction. More specifically, the cutting edge 185 of the cutting blade 180 is defined at a vertex defined between a first vertical sidewall of the cutting blade and a second sidewall. In an installed position, the stop surface 210 of the blade stop 200 is arranged directly adjacent to and abutting the first vertical sidewall of the cutting blade 180. By locating the blade stop 200 directly adjacent to the cutting blade 180, the cable is positioned by the blade stop in the most accurate manner with respect to the adjacent blade, minimizing variations resulting from, for example, axial misalignment and/or runout.

A predetermined offset distance D (see FIG. 7) between the leading edge 185 of the blade 180 and the stop surface 210 corresponds to the maximum allowable cutting depth of the blade into the cable. Once the blade has cut to the predetermined depth D, the stop or engaging surface 210 of the stop 200 comes into abutting contacting with the insulation layer 18. After initial contact is made, the stop 200 prevents the blade 180 from engaging further into the insulation layer 18. Further radially-inward motion of the blades 180 results in the stop surfaces 210 biasing the cable 10 radially inward, or toward its ideal axial center aligned with axis A. More specifically, as the cable 10 is generally flexible, it should be understood that the stop surface 210 acts to center the cable during the cutting operation, biasing the outer periphery of the cable toward an ideal center position. This is particularly important in the cutting of flexible objects, such as a cable, as the lack of rigidity of the cable would otherwise result in the cable being off-center during cutting operations, limiting the accuracy with which the cut can be made, and thus risking damage to the cable, for example, cutting to an undesired depth. Like the cutting blades 180, the arcuate nature of the stop or engaging surfaces 210 of the blade stops 200 converge to form a near continuous support surface for the outer surface of the cable, or at least a support surface simultaneously engaging a majority of an outer circumference of the cable (i.e., forming a majority of a circle). In this way, the cable 10 is likewise supported about its outer perimeter in a uniform fashion, further improving the accuracy of the centering function performed by the blade stops 200, and thus the accuracy and uniformity of the cut.

With particular reference to FIG. 7, in another embodiment of the present disclosure, the blade stops 200 may be pivotally or otherwise movably mounted to the cutting heads 140, and supported in an elastic manner, such as by springs 250. The spring s250 may apply sufficient force on the blade stops 200 such that they operate in the above-described manner, accurately positioning the cable 10 during cutting and preventing cutting to an excess depth. However, as the blade stops 200 are elastically mounted, additional pressure applied in the radially inward direction by the rotation of the holders 140 may be operative to bias the stops 200 in a direction radially away from the cable, permitting a degree of further engagement of the cutting blades 180 into the cable. Likewise, the blade stops 200 may be formed from an elastic material, imparting similar elastic behavior in the radial direction and permitting cutting depths which vary in either direction from an initial offset distance between the stop surfaces 210 and the leading edges of the blades 185. The ability to vary the cutting depth without having to manually reposition the cutting blades 180 and/or the blade stops 200 may be useful to an operator performing the cable processing operations for any number of reasons.

Figure 8:
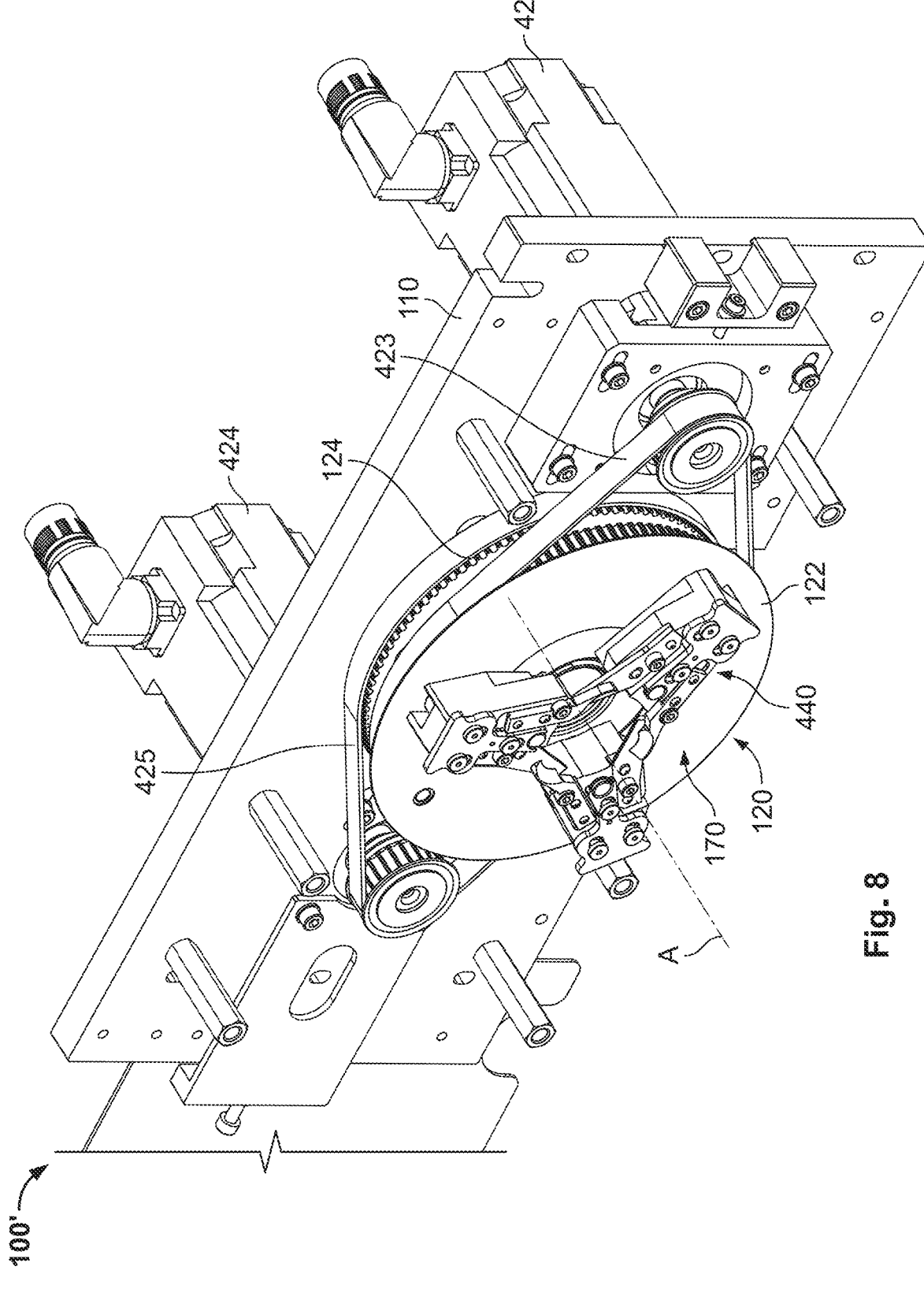
FIG. 8 is a perspective view of an HV-CP machine according to an embodiment of the present disclosure.
Figure 9:
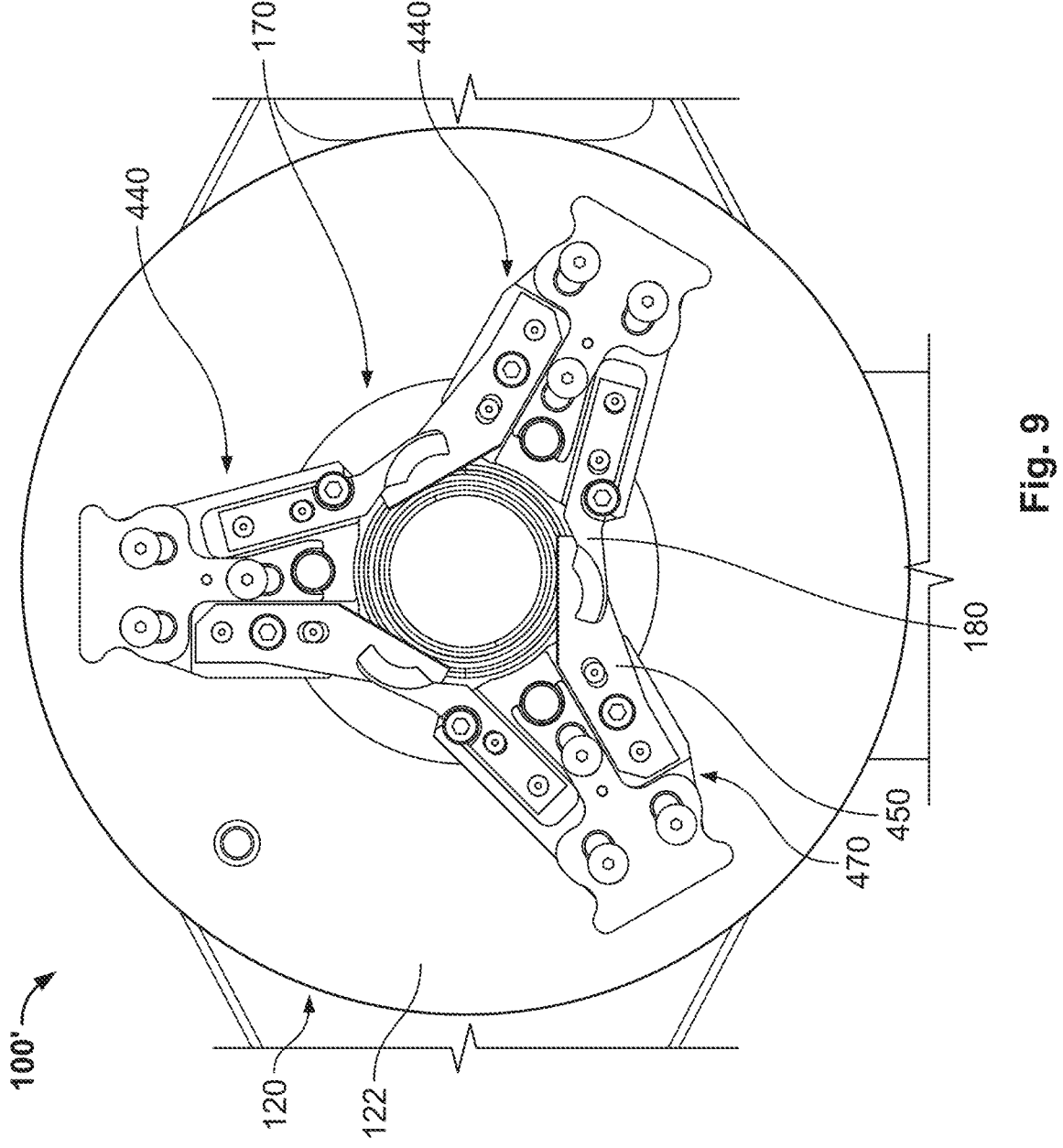
FIG. 9 is a partial front view of the HV-CP machine of FIG. 8, including a cutting blade and braid flaring assembly.

FIGS. 8 and 9 show another embodiment of the HV-CP machine or device 100' having features substantially similar to those set forth above with respect to the machine 100 shown in FIGS. 2 and 3, unless otherwise noted. With particular reference to FIG. 8, the HV-CP machines 100, 100' include drive actuators 422, 424 mounted to the base 110. The actuators 422, 424 are adapted to drive the pulleys 122, 124 via respective belts 423, 425 for controlling rotation of each of a plurality blade holders 440, as well as for controlling the radial position of a cutting blade assembly 470 including the plurality of blade holders 440 relative to the cable 10.

The blade holders 440 comprise features similar to those set forth above with respect to the blade holders 140. More specifically, in addition to the blades 180, the blade holders 440 further include braiding flaring elements 450 mounted thereto. The flaring elements 450 are adapted to engage with an outer circumferential surface of the braiding layer 16 after being exposed by the cutting blades 180. The flaring elements 450 work in conjunction with a flaring sleeve 455 (see FIG. 12) to flare the braiding layer 16 in a radially outward direction. Specifically, the flaring sleeve 455 is movable in an axial direction of the cable, and is adapted to abut a free end of the braiding layer 16 and deform the braiding layer in a radially outward direction against the flaring elements 450. Like the cutting blades 180, the braiding flaring elements 450 are moved radially inward and outward relative to the cable held in the machine 100' via selective rotation of the blade holders 440, as described above with respect to the blade holders 140. It should be noted that selective engagement of the braid flaring elements or the cutting blades 180 with the cable is achieved via rotation of each blade holder in respective opposite directions.

With reference generally to FIGS. 13-17, the cable processing device or machine 100' further includes a cable clamp or holder 478 for holding the cable 10 during processing. One or more actuators 479 are adapted to open and close the clamp 478 for selectively securing the cable 10 therein. A linear translation actuator 480 is adapted to move the clamp 478 in the axial directions of the cable 10 (i.e., toward and away from the cutting blade assembly 470 along axis A illustrated in FIG. 8). In other embodiments, or in addition, the cutting blade assembly 470, including the blade holders 440, may be moveable in the axial directions along the axis A. In either embodiment, after a cutting operation is performed, cut material (e.g., the outer insulation layer 18) may be stripped or removed by translating the cable 10 and/or the holders 440 axially, and pulling the cut material from a remainder of the cable via the blades 180. Further, the same axial translation of at least one of the cable 10 or the blade holders 440 may be used to selectively abut or engage the blades 180 with the flared braiding layer 16 for performing folding operations, as set forth in greater detail herein.

Figure 10:
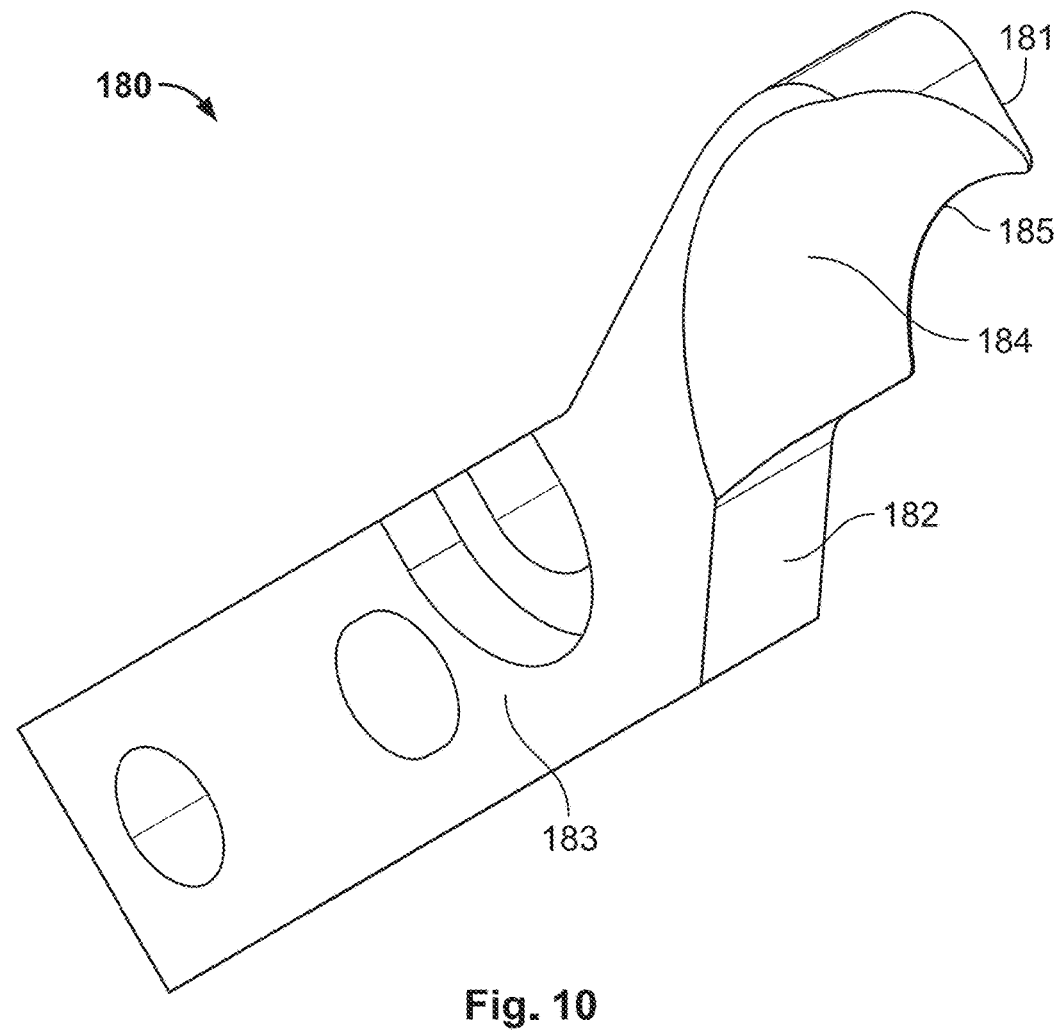
FIG. 10 is a perspective view of a cutting blade according to an embodiment of the present disclosure.
Figure 11:
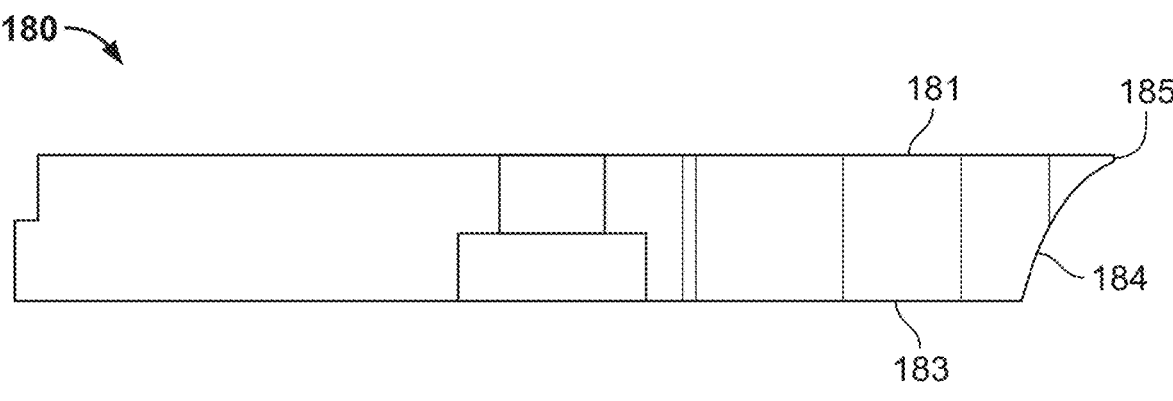
FIG. 11 is a bottom view of the cutting blade of FIG. 10.
Figure 12:
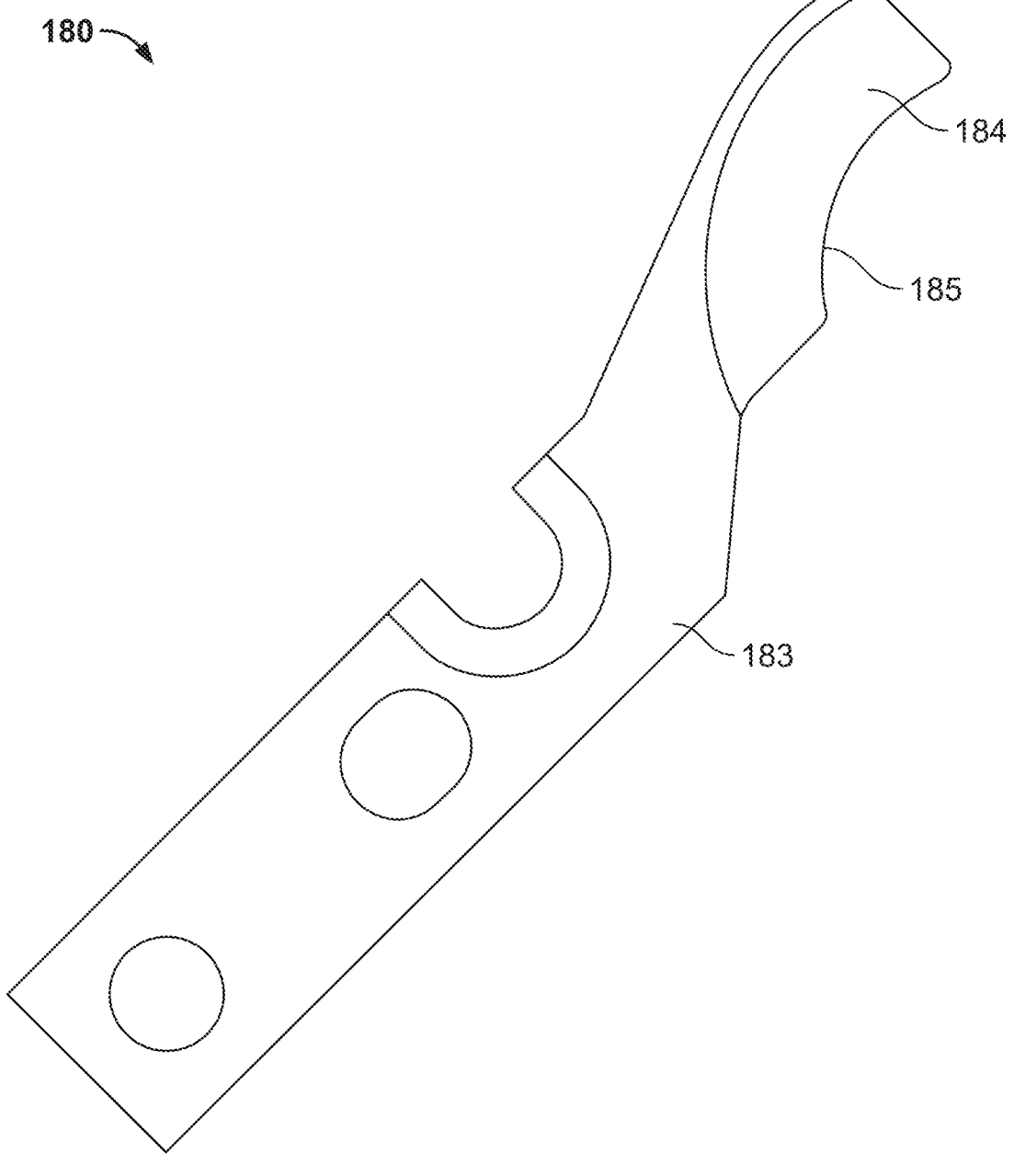
FIG. 12 is a front view of the cutting blade of FIGS. 10 and 11.

Referring now to FIGS. 10-12, as set forth above with respect to FIG. 4, the body 182 of each cutting blade 180 defines the folding surface 184. In the exemplary embodiment, from the cutting edge 185, the folding surface 184 defines a curved or partially-spherical profile extending through a thickness of the body 182 toward a front face 183 thereof. With respect to the axis A, or a central axis about which the arcuate surfaces of the folding surface 184 and cutting edge 185 are defined, a radius of the folding surface 184 increases moving from a rear face 181 of the body 182 toward the front face 183. In addition to being curved about the axis A, the cutting surface is also curved with respect to an axis perpendicular or transverse to the axis A. In this way, the folding surface 184 may be described as forming a portion or segment of a dome, or being dome-shaped. The folding surface 184 proximate the rear face 181 of the blade 180 substantially opposes, or is oriented perpendicular to, an axially facing end of the cable 10. Moving from the rear face 181 toward the front face 183, the folding surface 184 transitions toward a parallel orientation with the axial direction of the cable. As will be set forth in greater detail herein, in response to abutting a flared end of the braiding layer 16 of a cable 10, the shape of the folding surface 184 is adapted to fold the end of the braiding backwards over an outer surface of the cable in an overlapping manner in response to relative axial movement between the cable and the cutting blade(s) 180.

Using the system of FIGS. 2, 3, 8 and 9, embodiments of the present disclosure include a method for folding cable braid (e.g., the braiding layer 16) with the cutting blades 180. Specifically, the curved profile of the folding surface 184 is adapted to be placed into abutting contact with a flared free end of the braiding layer 16. In response to this contact, the free end of the braiding layer 16 follows and/or is guided by the curved contour of the folding surface 184 of the blade 180, and is folded (i.e., plastically deformed) backwards and over the outer insulation layer 18. The curved folding surface 184 can be used to capture all braid material of the free end of the braiding layer 16 by conforming generally to the radius or circumference of the cable 10. Once captured, a series of push, retract, rotate, and push steps of the cutting blades 180 and/or the cable 10 are used to achieve complete and uniform folding of the braiding layer 16 or cable braid.

Figure 13:
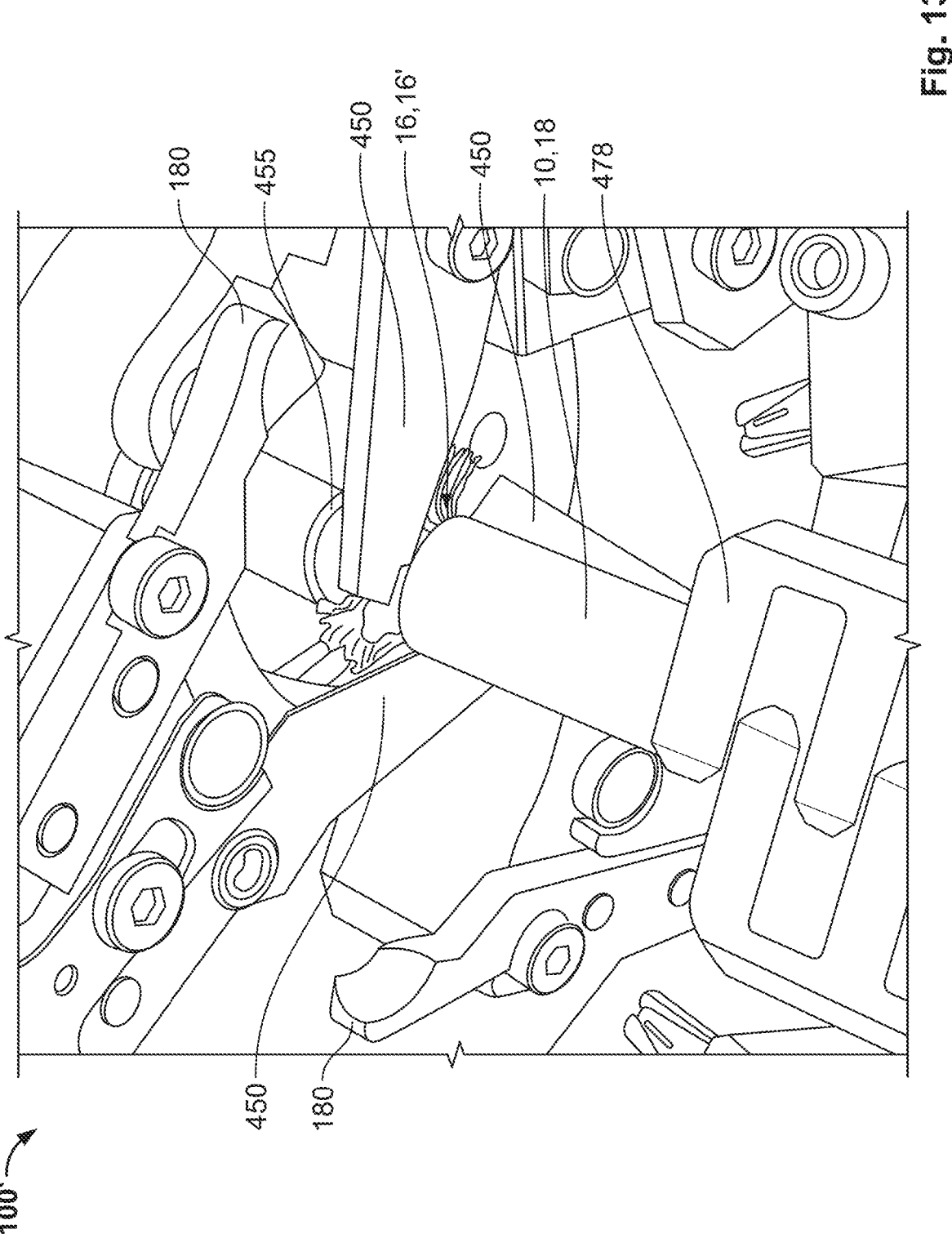
FIG. 13 is a front perspective view of the HV-CP machine of FIG. 8 illustrating a braid or braiding layer flaring processes performed during a cable processing method according to an embodiment of the present disclosure.
Figure 14:
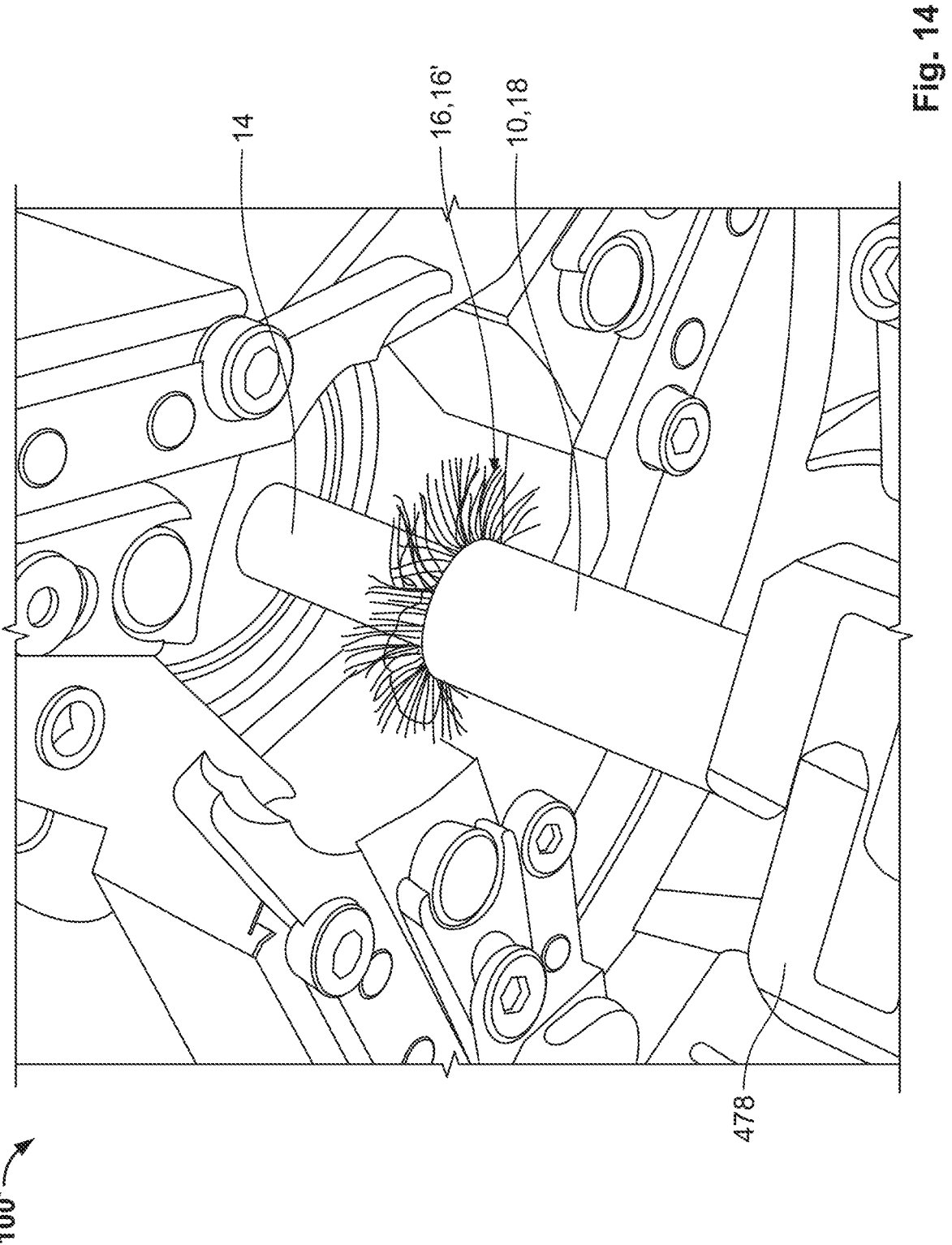
FIG. 14 illustrates the cable after performance of the blade flaring process illustrated in FIG. 13.

Referring to FIGS. 13-16 the method of folding the braiding layering 16 is illustrated. After the outer insulation 18 of the cable 10 has been removed via the cutting blades 180, in a first flaring step, the braid flaring elements 450 engage with or are positioned just over an outer surface of the braiding layer 16. The flaring sleeve 455 is moved in the axial direction of the cable toward the flaring elements 450 (e.g., via a linear actuator 456), and engage a free end 16' of the braiding layer 16 for deforming or flaring the braiding layer against, or in a direction toward, the flaring elements 450. Rotation of the blade holders 440 about an axis of the cable 10 followed by engagement of the flaring sleeve 455 with the braiding layer 16 uniformly flares the free end 16' of the braiding layer 16 in a radially outward direction, as shown in FIG. 14.

Figure 15:
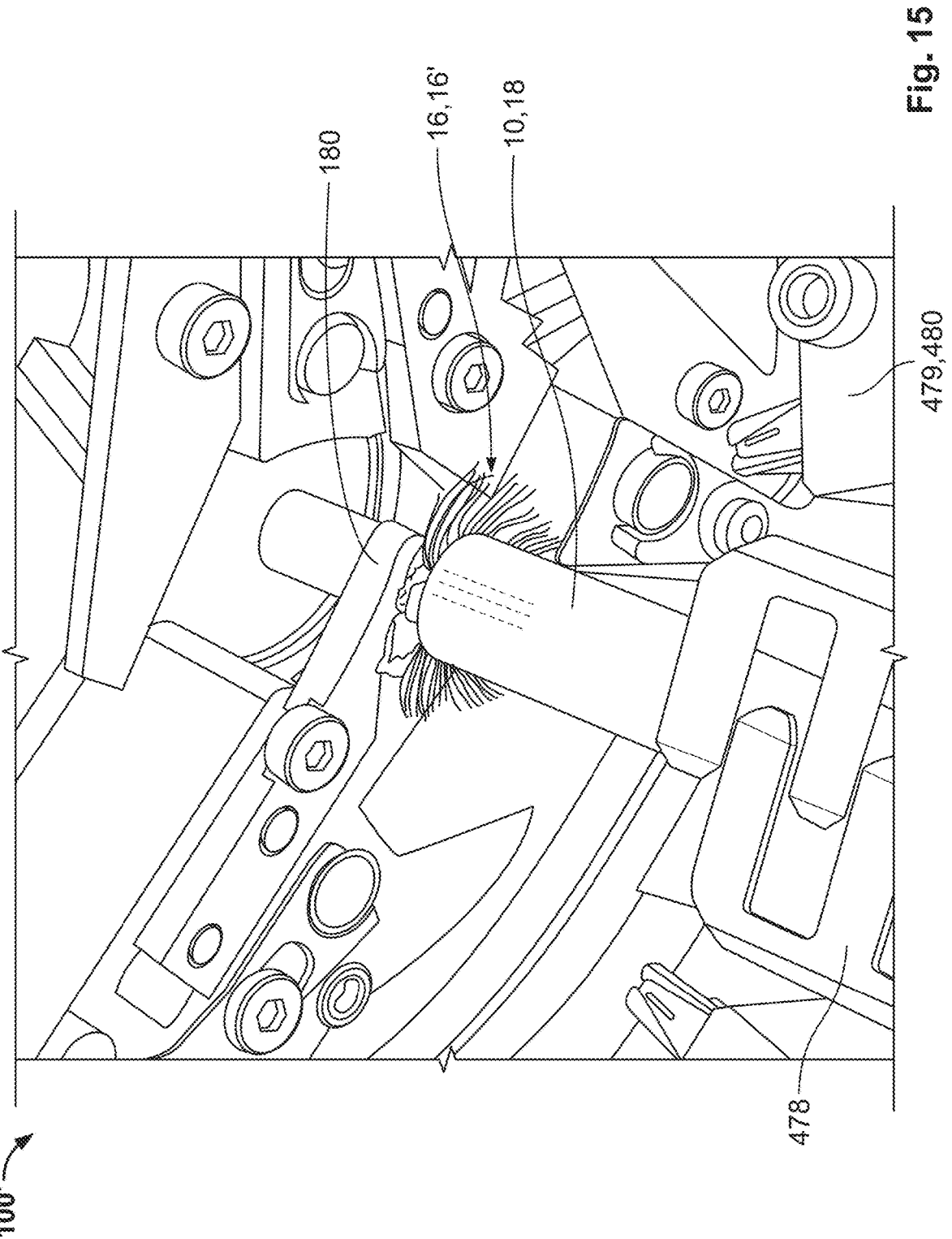
FIG. 15 illustrates an intermediate step in a braid or braiding layer folding process according to an embodiment of the present disclosure.
Figure 16:
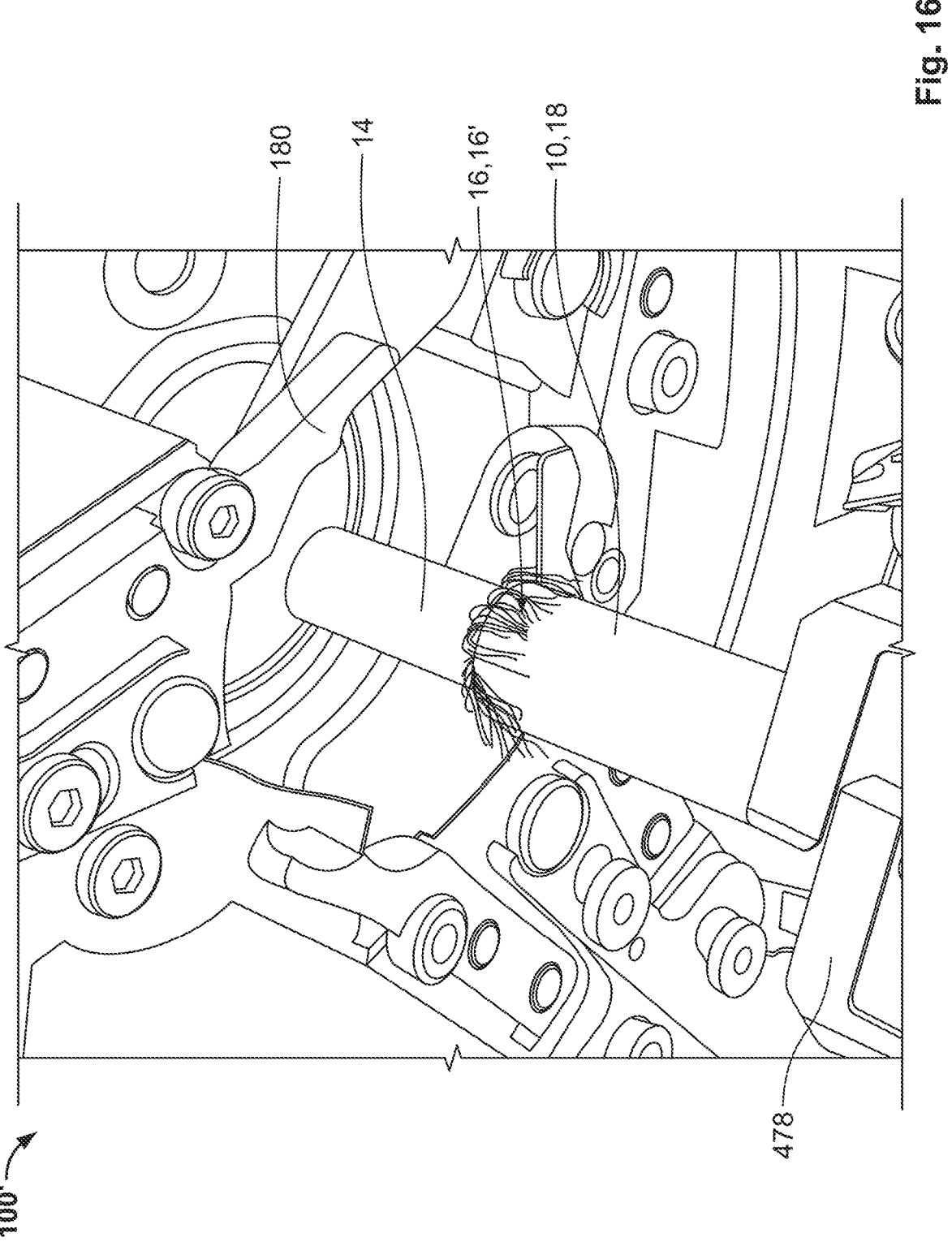
FIG. 16 illustrates the results of the cable processing method according to embodiments of the present disclosure, wherein the braiding layer has been folded over an outer insulation of the cable.
Figure 17:
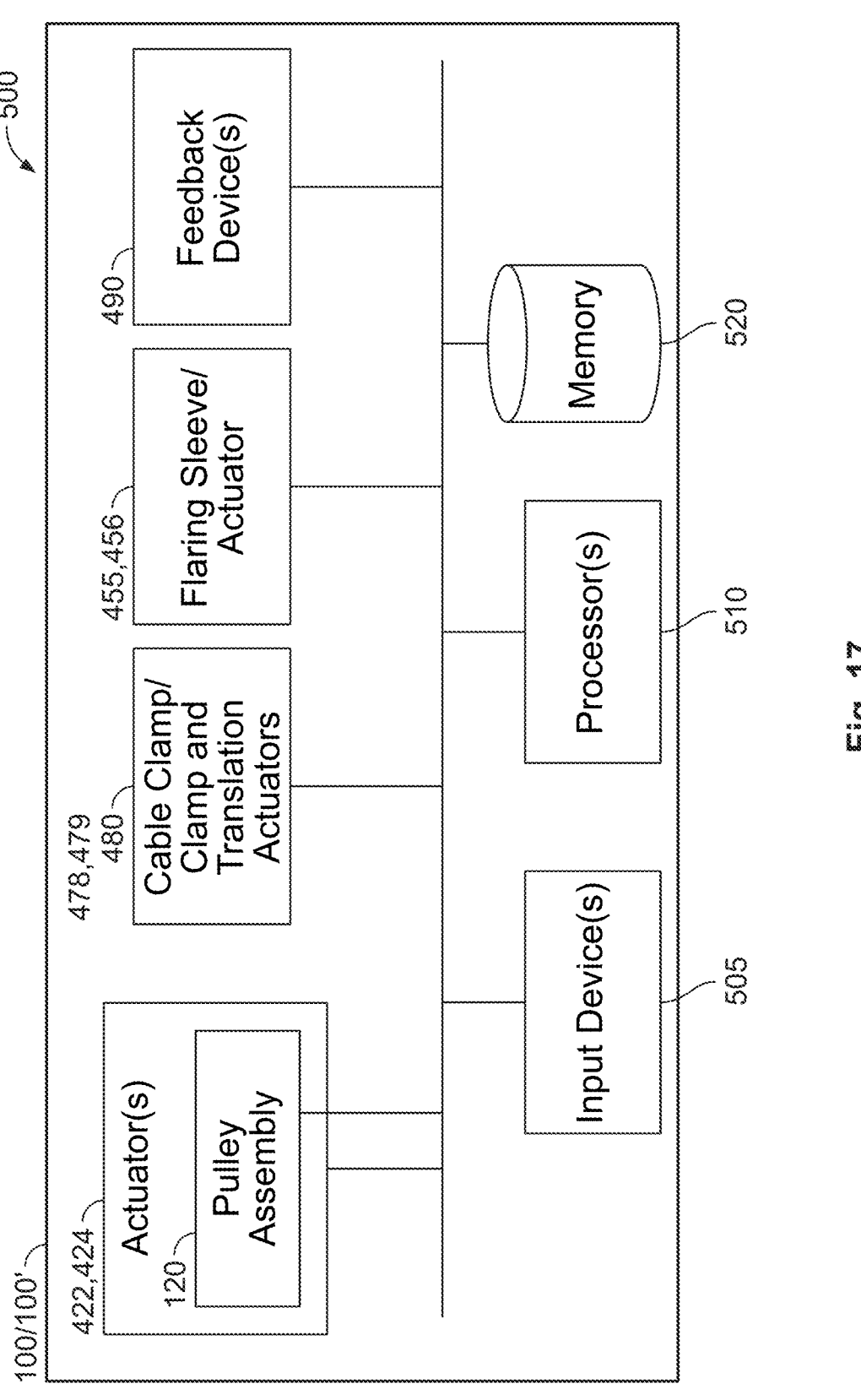
FIG. 17 is a schematic diagram of the HV-CP machine and associated control system(s) adapted to perform the cable processing methods according to embodiments of the present disclosure.

With reference now to FIG. 15, after the flaring step, the machine 100' moves the blades 180 radially inward from a retracted position shown in FIG. 13, to an initial engagement position. Once positioned, the cable 10 (or the blades 180) is biased in an axial direction toward the blades 180. This engages the curved, axially-facing folding surfaces 184 of the blades 180 with the free, flared end 16' of the braiding layer 16. Continued axial translation of the cable 10 toward the cutting blades 180 is operative to fold the braiding layer 16 back over the outer insulation layer 18, as shown in FIG. 15. In order to uniformly fold the braiding layer 16, the cable 10 may be retracted away from the blades 180 in an opposite axial direction, the blades 180 and the blade holders 440 rotated about the axis A, and the cable pushed back into contact with the blades in the axial direction. Repeating these steps ensures the braiding layer 16 is folded about its entire circumference in a uniform manner. FIG. 16 illustrates the results of this series of push, retract, rotate, and push steps, and more specifically, a complete and uniform fold of the free end 16' of the braiding layer 16.

Methods according to embodiments of the present invention may be carried out wholly or in part by one or more automated control systems implementing and/or controlling the above-described components, as well as additional hardware and software features. For example, referring generally to FIG. 17, an exemplary control system 500 useful for performing the operations of the embodiments of the present disclosure is shown. The control system 500 may be under fully-automated control, or fully or partially controlled via one or more user input devices 505 (e.g., touch screen/ buttons/keyboards, etc.). The control system 500 includes at least one processor 510, such as a digital microprocessor responsive to instructions stored on a memory device 520 for performing the methods or operations described herein. The processor 510 is operatively coupled to the above-described actuators for controlling the operation of the system 100, 100' as set forth above. The control system 500 may further include feedback devices 490, such as one or more sensors and/or cameras, which may be operative with the processor 510 to monitor system performance in real-time and adjust operating parameters in order to ensure repeated and accurate cable processing.

The system 500, and more specifically the processor 510, may control the operation of the actuators 422, 424 of the pulley assembly 120 for selective engaging either the cutting blades 180 or the flaring elements 450 of the machine 100, 100' with the cable 10, and rotating the same for performing cutting, stripping, folding and/or flaring operations. Likewise, the processor 510 is operative to control the actuator(s) 479, 480 of the cable clamp 478, as well as the actuator 456 of the flaring sleeve 455, for realizing the above-described operations.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A cable processing device, comprising:

at least one cutting blade defining a cutting edge and a curved folding surface;

at least one first actuator operatively connected to the cutting blade and adapted to translate the cutting blade relative to a cable to be processed in a cutting direction;

at least one second actuator adapted to translate at least one of the cable or the cutting blade along an axial direction of the cable; and a processor operative with a memory device and adapted to:

with the at least one first actuator, engage the cutting edge of the cutting blade with the cable in the cutting direction for removing a portion of a first layer of the cable and exposing a portion of a second layer of the cable; and with the at least one second actuator, engage the folding surface of the at least one cutting blade with an exposed free end of the second layer of the cable for folding the free end of the second layer back over a portion of the cable.

2. The cable processing device of claim 1, wherein the first layer is an outer insulation layer of the cable, and the second layer is a braiding layer of the cable.

3. The cable processing device of claim 2, further comprising at least one braid flaring element adapted to flare an end of the braiding layer, the processor operative with the memory device to engage the folding surface of the at least one cutting blade after the end of the braiding layer is flared with the at least one flaring element.

4. The cable processing device of claim 3, further comprising at least one blade holder to which the at least the cutting blade and the at least one flaring element are mounted, wherein rotation of the at least one blade holder in a first rotational direction via the at least one first actuator selectively engages one of the at least one cutting blade or the at least one flaring element with the cable, and rotation of the at least one blade holder in a second rotational direction via the at least one first actuator selectively engages the other one of the at least one cutting blade or the at least one flaring element with the cable.

5. The cable processing device of claim 1, further comprising a cable clamp selectively fixing the cable relative to the at least one cutting blade in a radial direction.

6. The cable processing device of claim 5, wherein the clamp is movable relative to the at least one cutting blade along the axial direction of the cable via the at least one second actuator.

7. The cable processing device of claim 6, wherein the processor is further operative with the memory device to, after engaging the folding surface of the at least one cutting blade with the free end of the second layer:

disengage the free end of the second layer of the cable from at least one cutting blade;

rotate one of the at least one cutting blade or the cable about the axis of the cable; and reengage the folding surface of the at least one cutting blade with the free end of the second layer.

8. The cable processing device of claim 7, wherein the processor is operative with the memory device to repeat the steps of disengaging, rotating, and reengaging until the free end of the second layer of the cable is uniformly folded about its circumference.

9. The cable processing device of claim 7, wherein:

the step of disengaging the free end of the second layer of the cable from the at least one cutting blade comprises translating the clamp in a first axial direction of the cable away from the at least one cutting blade via the at least one second actuator; and the step of reengaging the at least one cutting blade with the free end of the second layer includes translating the clamp in a second axial direction of the cable toward the at least one cutting blade via the at least one second actuator.

10. The cable processing device of claim 1, wherein the cutting edge and the folding surface of the at least one cutting blade are curved in a radial direction with respect to an axis of rotation of the cable preparation device or the axis of the cable.

11. The cable processing device of claim 10, wherein the folding surface of the at least one cutting blade is further curved about an axis oriented transverse to the axis of rotation of the cable preparation device or the central axis of the cable.

12. The cable processing device of claim 1, wherein the folding surface is partially spherical.

13. The cable processing device of claim 1, wherein the at least one cutting blade comprises a plurality of cutting blades arranged radially about the cable, the cutting edges of the plurality of cutting blades are sized and shaped to define a majority of a circle for simultaneously engaging with a corresponding majority of an outer circumferential surface of the cable.

14. A method of processing the cable preparation device of claim 1 comprising the steps of:

flaring an exposed free end of at least one layer of a cable; and folding the flared exposed free end of the at least one layer of the cable back over a portion of the cable by engaging the exposed free end of the at least one layer of a cable with a folding surface defined on a cutting blade of the cable preparation device.

15. The method of claim 14, further comprising the step of, prior to flaring the free end of the at least one layer of the cable, cutting an outer layer of the cable with a cutting edge of the cutting blade.

16. The method of claim 15, further comprising the step of, after cutting an outer layer of the cable, removing a portion of the outer layer of the cable with the cutting blade for exposing the free end of the at least one layer of the cable.

17. The method of claim 16, wherein:

the outer layer of the cable comprises an outer insulating layer of the cable; and the at least one layer of the cable comprises a braiding layer of the cable, the braiding layer folded backwards over a portion of the outer insulation layer by the folding surface of the cutting blade.

18. The method of claim 17, wherein the step of folding the free end of the braiding layer of the cable further includes the steps of:

disengaging the free end of the braiding layer of the cable from the folding surface of the cutting blade;

rotating one of the cutting blade relative to the cable or the cable relative to the cutting blade; and reengaging the folding surface of the cutting blade with the free end of the braiding layer.

19. The method of claim 18, further comprising the step of repeating the steps of disengaging, rotating, and reengaging until the free end of the braiding layer of the cable is uniformly folded backwards over the portion of the cable about its circumference.

20. A method of processing the cable preparation device of claim 1 comprising the steps of:

removing a portion of an outer insulation layer of the cable with a cutting edge of a cutting blade of the cable preparation device;

flaring an exposed free end of a braiding layer of the cable with a flaring element; and folding the exposed free end of the braiding layer cable back over a portion of the outer insulation layer by engaging the exposed free end of the braiding layer with a curved folding surface defined on the cutting blade.

* * * * *